US 8,230,277 B2

(12) United States Patent
Mudge et al.

(10) Patent No.: US 8,230,277 B2
(45) Date of Patent: Jul. 24, 2012

(54) STORAGE OF DATA IN DATA STORES HAVING SOME FAULTY STORAGE LOCATIONS

(75) Inventors: Trevor Nigel Mudge, Ann Arbor, MI (US); Ganesh Suryanarayan Dasika, Ann Arbor, MI (US); David Andrew Roberts, Ann Arbor, MI (US)

(73) Assignees: ARM Limited, Cambridge (GB); The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 13/064,601

(22) Filed: Apr. 4, 2011

(65) Prior Publication Data
US 2011/0185260 A1    Jul. 28, 2011

Related U.S. Application Data

(63) Continuation of application No. 11/822,150, filed on Jul. 2, 2007, now Pat. No. 8,145,960.

(60) Provisional application No. 60/831,958, filed on Jul. 20, 2006, provisional application No. 60/831,929, filed on Jul. 20, 2006.

(51) Int. Cl.
*G11C 29/00* (2006.01)
*G06F 13/00* (2006.01)

(52) U.S. Cl. .......................... 714/723; 714/710; 711/118

(58) Field of Classification Search .................. 714/710, 714/718–723
See application file for complete search history.

(56) References Cited

U.S. PATENT DOCUMENTS

| 5,883,904 | A   |   | 3/1999  | Arimilli et al. |        |
|-----------|-----|---|---------|-----------------|--------|
| 5,926,484 | A   | * | 7/1999  | Takusagawa      | 714/710|
| 7,058,864 | B1  | * | 6/2006  | McHardy et al.  | 714/723|
| 7,647,536 | B2  | * | 1/2010  | Dempsey et al.  | 714/711|
| 2006/0280019 | A1 | * | 12/2006 | Burton et al.  | 365/226|

OTHER PUBLICATIONS

A. Agarwal et al, "A Process-Tolerant Cache Architecture for Improved Yield in Nanoscale Technologies" *IEEE Transactions on Very Large Scale Integration (VLSI) Systems*), vol. 13, No. 1, Jan. 2005, pp. 27-38.
M. Nicolaidis et al, "A Memory Built-In Self-Repair for High Defect Densities Based on Error Polarities" Proceedings of the 18th IEEE Int'l Symposium on Defect and Fault Tolerance in VLSI Systems (DFT'03), 2003.
AJ KleinOsowski et al, "The NanoBox Project: Exploring Fabrics of Self-Correcting Logic Blocks for High Defect Rate Molecular Device Technologies" pp. 1-10.
Final Official Action mailed Apr. 25, 2011 in co-pending U.S. Appl. No. 11/822,150.

* cited by examiner

*Primary Examiner* — Jeffrey A Gaffin
*Assistant Examiner* — Daniel McMahon
(74) *Attorney, Agent, or Firm* — Nixon & Vanderhye P.C.

(57) ABSTRACT

Data storage control circuitry for controlling storage and retrieval of data in a data store in which data is stored in data blocks. A group data store stores data by grouping together blocks that have at least one faulty bit into groups of at least two blocks. For each group of blocks at least one of the blocks has a non-faulty bit for each of the bit locations in the blocks. A selector data store stores indicators for each group indicating which bits of the blocks within a group are the non-faulty bits. When storing data to a data block within a group, the data is stored in each of the blocks within the group. When retrieving data from a data block within a group, the data is read from respective bits of the blocks within the group as indicated by the indicators.

15 Claims, 9 Drawing Sheets

STORAGE OF DATA IN DATA STORES HAVING SOME FAULTY STORAGE LOCATIONS

This application is a Continuation of application Ser. No. 11/822,150, filed Jul. 2, 2007 now U.S. Pat. No. 8,145,960, which claims priority to U.S. Provisional Application Nos. 60/831,958, filed Jul. 20, 2006, and 60/831,929, filed Jul. 20, 2006. The entire contents of these applications are incorporated herein by reference.

BACKGROUND OF THE INVENTION

1. Field of the Invention

This invention relates to the field of data storage in data processing systems. More particularly, this invention relates to correcting for faults in data stores.

2. Description of the Prior Art

Recent technological moves to decrease the size and power consumption of memory cells, in particular in on-chip caches has increased the amount of faults within these systems. In particular, it has been found that significantly more memory cells fail when operated at lower voltages and when formed in a smaller area.

This problem has been addressed in the paper "A Memory Built-In Self Repair for High Defect Densities Based on Error Polarities" by Nicolaidis, M.; Achouri, N.; Anghel, L.; Defect and Fault Tolerance in VLSI Systems, 2003. Proceedings. 18th IEEE International Symposium on 3-5 Nov. 2003 Page(s):459-466.

This describes a system that corrects for errors within a memory system by pairing data blocks within the memory system that do not have errors in the same locations. There is a requirement that error polarities are known and constant. Blocks with the same error polarity are paired and as the error polarity is known logic can be used to ensure that a correct value is output for each location from the two error blocks.

This requires the system to know the direction in which faulty bits are flipped i.e. 0 to 1 or 1 to 0. In practice and increasingly for future process technologies, this information is unpredictable and can change between successive accesses of the same memory cell. Therefore this scheme has disadvantages.

A related idea of dynamically resizing a cache due to faults is presented in; "A process-tolerant cache architecture for improved yield in nanoscale technologies" by Agarwal, A.; Paul, B. C.; Mahmoodi, H.; Datta, A.; Roy, K.; Very Large Scale Integration (VLSI) Systems, IEEE Transactions on Volume 13, Issue 1, January 2005 Page(s) 27-38.

In storage systems that have a high error rate it would be desirable to be able to make use of data storage blocks that have some faults in them.

SUMMARY OF THE INVENTION

A first aspect of the present invention provides data storage control circuitry for controlling storage and retrieval of data in a data store in which data is stored in data blocks, each of said data blocks comprising a plurality of bits, said data store comprising at least one faulty bit within at least some of said data blocks, said data storage control circuitry comprising: a group data store related to said data store for storing data grouping together data blocks from said data store that have at least one faulty bit into groups of at least two of said data blocks, said data blocks being grouped such that for each group at least one of said data blocks has a non-faulty bit for each of said plurality of bit locations in said data blocks; and a selector data store for storing indicators for each of said groups of data blocks, said indicators indicating which bits of said data blocks within a group are said non-faulty bits; data storage logic for controlling storage of data in said data store, said data storage logic being responsive to an instruction to store data in a data block that is present in one of said groups of data blocks, to store said data in each of said data blocks within said group of data blocks; and data access logic for controlling retrieval of data from said data store, said data access logic being responsive to an instruction to read data from a data block that is present in one of said groups of data blocks, to read each of said plurality of bits of said data from one of said data blocks within said group said one of said data blocks being selected for each bit in dependence upon said stored indicators for said group such that no faulty bits are read.

With increasing numbers of faults in data storage circuitry due to the desire to reduce the size and power consumption of such circuitry there is a desire to be able to make use of addressable data storage blocks that may contain a fault, rather than discarding any block with a fault in it. The present invention recognizes this need and realizes that much data storage circuitry has faults within it whose locations can be found by simple test mechanisms. The present invention uses the test results indicating the location of faulty bits within data blocks to group together two or more data blocks such that for each group at least one of said data blocks has a non-faulty bit for each of the bit locations of the data block. A selector data store can then be used to store indicators for each of the groups of the blocks, these indicators indicating which bits of the grouped data blocks are the non-faulty bits. This could clearly be done by the indicators indicating either faulty or non-faulty bits as either is sufficient information to derive the non-faulty bits. Thus, if a piece of data is stored in each data block within a group then there will always be a non-faulty or correct bit for each location within the block, so provided it is known which bits are faulty the data can be retrieved from the data store even though it is only stored in faulty data blocks. Thus, the faulty data blocks can be used, albeit they need to be grouped together to store a single data item, and some sort of selector bit storage is also required to provide the information on which bits to use.

A further advantage of the present invention is that data storage blocks that do not contain errors can be used to store data as usual and apart from needing to check whether they are in a group or not the system can proceed to store and retrieve data from them without any further overhead.

Furthermore, the invention provides for the possibility of groups of more than two blocks and thus, the number of blocks within a group can be adjusted depending upon the anticipated likelihood of a fault. The more blocks there are in a group the more likely it is to be able to find groups where a non-faulty bit can be found for all the plurality of bits in a block even where there is a high error rate, however, a drawback is that the selection of the blocks clearly becomes more complicated.

When compared with the prior art, the system can tolerate higher error rates than existing schemes such as Hamming codes and BCH codes (single- and double-error correcting). Furthermore, the scheme is not dependent on error polarities i.e. knowing the direction in which faulty bits are flipped i.e. 0 to 1 or 1 to 0. In practice and increasingly for future process technologies, this information is unpredictable and can change between successive accesses of the same memory cell.

Advantages of embodiments of the invention include a simple hardware implementation which may take advantage of existing structures (for example, when they are applied to cache memory). In addition, a larger fraction of memory blocks are recovered by the scheme than is the case with conventional techniques.

The scheme of the invention can be used to repair hard errors in memory cells. In addition, it can protect against soft memory errors. It provides an adjustable level of error correction based upon the anticipated error rates. The invention is particularly applicable to current and future process technologies that exhibit higher error rates due to process variation and voltage reduction (including dynamic voltage scaling).

The invention can also be applied to correcting for faults in main memories, caches and other on-chip storage, storage media (e.g. to mitigate Flash memory wear-out) including disk devices.

In some embodiments, said group data store and said selector data store do not comprise faulty bits.

In order for the invention to work well embodiments of the invention provide a group data store and selector data store that do not comprise faulty bits.

The correction for faulty bits in the main data store relies on the group data store and select data store being accurate, thus, in embodiments these data stores are arranged so as not to have faults themselves.

In some embodiments, said group data store and said selector data store are formed from storage circuitry having larger storage cells than storage circuitry forming said data store.

The cell size of storage circuitry is related to the probability of it being faulty. Furthermore, this is not a linear relationship and a small increase in size of the storage cell may result in a large increase in the reliability of these cells. Thus, by providing the group data store and selector data store in storage circuitry that has a larger cell size than the data store that they are correcting the probability of there being an error in this correction storage is reduced.

In some embodiments, said group data store and said selector data store are formed from higher voltage storage circuitry than storage circuitry forming said data store.

The voltage level of the storage circuitry also has an effect on errors. Given that the group data store and selector data store generally store far less data than the main data store they are correcting, and the fact that it is important that they do not have errors, it may be advantageous to operate them at a higher voltage than the main data store and thereby reduce the possibility of them having errors.

In some embodiments, said group data store and said selector data store comprise error correction means.

Alternatively, the group data store and selector data store can have some sort of error correction means associated with them such that if they do have faulty bits these can be corrected for.

In some embodiments, said selector data store is adapted to store indicators for each bit, said indicators indicating which data block from said data blocks within said corresponding group each of said bits is to be read from.

The selector data store can store the indicator data in a number of ways, the simplest being to store a bit for each location in the data block, each bit then being used as a selection bit to select the data block having the good data. Although this is the simplest method it clearly has considerable data storage implications.

In some embodiments, said selector data store, stores for each group of data blocks, a set of indicators, each indicator corresponding to two or more bits of said data blocks, said set of indicators indicating which data block each of said corresponding two or more bits is to be read from, said data blocks being grouped such that no more than one of said blocks within a group comprise a faulty bit within each of said sets of two or more bits.

An alternative is to have just one selector bit for several bits of data in the data block. In other words, each data block is divided into sections and provided faulty bits are not located in the same section in either of the data blocks then a non-faulty section can be selected from each block in response to the indicator bits. The number of bits in each section clearly has an implication on how many indicator bits are needed, but it also has an implication on what blocks can be corrected for. Clearly, the larger the section then the fewer indicator bits that are needed but the more difficult it is to group data blocks that do not have errors in the same sections. The optimal size of the sections will therefore depend on the error rate in the data store. Thus, a preferred size of section can be selected depending on the data store concerned and also possibly on the number of blocks in a group.

In some embodiments said data storage control circuitry further comprises said data store for storing data in data blocks, each of said data blocks comprising a plurality of bits, said data store comprising at least one faulty bit within at least some of said data blocks.

In some embodiments the data storage control circuitry may be part of the data store itself, while in other embodiments it may be separate to it.

A second aspect of the present invention provides a data processing apparatus for processing data said data processing apparatus comprising a processor for processing data data storage control circuitry according to a first aspect of the present invention for controlling storage and retrieval of data processed by said processor in said data store.

A data processing apparatus having data storage control circuitry can use this to allow it to store data in faulty data stores efficiently.

In some embodiments, said data processing apparatus further comprises testing logic for testing said data store for faulty bits, said testing logic being adapted to populate said group data store and said selector data store in response to a test of said data store.

Although, the group data store and selector data store may be populated from data stored in a memory, in some embodiments the data processing apparatus has testing logic within it which can test the data store and can then provide this information itself. This has the advantage of allowing the information about the faults to be updated as the data store faulty bits change with control voltage or over time.

In some embodiments, said data processing apparatus further comprises said data store for storing data processed by said processor in data blocks, each of said data blocks comprising a plurality of bits, said data store comprising at least one faulty bit within at least some of said data blocks.

The data processing apparatus may comprise the data store within it, alternatively it may be a peripheral storage device.

Although, the data store may comprise a number of different storage mechanisms, in some embodiments it comprises a cache.

Embodiments of the present invention are particularly useful for dealing with caches where it is important to try to retain as much of the cache as possible and also not to allow faulty bits to get into the output data. Furthermore, embodiments of the invention with their use of selector data and group data stores can profit from being implemented in such data processing apparatus using existing hardware structures such as caches.

In some embodiments, said cache comprises a set associative cache comprising a plurality of cache ways, and said data blocks comprise a cache line, within a cache way.

Embodiments of the present invention are particularly useful for dealing with set associative caches.

In some embodiments, said groups of data blocks each contain data blocks from different cache ways.

In the case of set associative caches, it is advantageous if the groups of data blocks are from different cache ways, this allows both data blocks within a group to be accessed in a single clock cycle and therefore increases performance. If the blocks are in the same cache set and in different cache ways this is even more advantageous, however, it may be more difficult to group blocks in such a way.

In some embodiments, said data processing apparatus further comprises a table lookaside buffer adapted to store a plurality of mappings of pages of virtual addresses to pages of physical addresses for said data processor; and said selector data store comprises a further buffer adapted to store selector data for cache lines within a current stored mapping of said table lookaside buffer, said data processing apparatus being responsive to updating of said table lookaside buffer from memory to update said further buffer.

One advantage of embodiments of the present invention is that it can be provided using a simple hardware implementation which takes advantage of existing structures. This is particularly so with caches. One disadvantage of embodiments of the present invention is the amount of selecting data which may be needed. If the data is to be accessed using a table lookaside buffer as is often the case with caches, it may be appropriate to in effect cache the selection data within a buffer and to only store at any one time selection data relating to cache lines that lie within current stored mapping of the table lookaside buffer. The buffer may store data for the whole of the mapping or for simply a subset of it. As it is this portion of the memory that is being dealt with at this time this is an appropriate thing to do. Furthermore, when a data access is attempted outside of the page, the table lookaside buffer needs to be updated and at this moment the selector data store can be updated too. Thus, the structure effectively caches the working set of selector bits without needing to hold selector bits to cover the entire cache. This reduces chip area and improves yield by reducing the amount of non faulty storage required on chip.

In some embodiments said data processing apparatus is responsive to a request to update said further buffer, to perform a test for faulty bits within cache lines corresponding to an updated mapping of said table lookaside buffer, and to update said further buffer in response to said test.

Although, the further buffer can be updated from memory like the table lookaside buffer is, in some embodiments testing is performed of the cache and it is updated from the results of this. It may be that accessing the selection data which may be stored off chip takes longer than performing a simple test on the required area of the cache.

A third aspect of the present invention provides a method of storing data within a data store in a data processing apparatus, said data store storing blocks of data, said method comprising the steps of: determining which bits within said data store are faulty bits; grouping together groups of at least two blocks within said data store, such that for each group at least one of said data blocks has a non-faulty bit for each of said plurality of bit locations in said data blocks; and storing information about said groupings in a group data store; storing indicators for each group of data blocks within a selector data store, said indicators indicating which bits within said grouped data blocks are said faulty bits; storing data in said blocks in said data store, such that if data is to be stored in a block present in one of said groups of blocks, said data is stored in each of said blocks within said group; and in response to an instruction to access said data store, determining from said group data store if said data to be accessed is in a block that has been grouped with at least one further block; if it is not access said block; and if it is access each bit of said data from a particular one of said data blocks within said group in dependence upon said stored indicators for said group such that no faulty bits are read.

It should be noted that the step of determining the bits that are faulty and then deriving the groups and indicator bits can be performed on a data processing apparatus that is performing the data storage or it can be done by a separate apparatus and stored in the data storage control circuitry.

A fourth aspect of the present invention provides data storage control circuitry for controlling storage and retrieval of data in a datastore in which data is stored in data blocks, each of said data blocks comprising a plurality of bits, said data store comprising at least one faulty bit within at least some of said data blocks, said data storage control circuitry comprising: a group data store associated with said data store for storing data grouping an odd number of at least three data blocks each having at least one faulty bit together, said data blocks being grouped such that a majority of said data blocks within a group do not have a faulty bit in a same location; data storage logic for controlling storage of data in said data store, said data storage logic being responsive to an instruction to store data in a data block that is present in one of said groups of data blocks, to store said data in all of said data blocks within said group; and data access logic for controlling retrieval of data from said data store, said data access logic being responsive to an instruction to read data from a data block appearing in one of said groups of data blocks, to compare each bit of data from said data blocks within said group and for each bit to output a value stored for said bit by a majority of said data blocks.

An alternative aspect of the present invention uses the grouping of data blocks with faulty bits in a slightly different way. In this case, an odd number of three or more data blocks, wherein for each data storage location a majority of the data blocks do not have faulty bits in a same location. The correct data can then be derived from the data blocks without using selector bits but by simply using a voting method. In other words, the bits output from each data block are compared and where the majority of them are the same it is known that these must be correct and these are output. This is a simple method of determining faulty bits that uses a particular grouping of the blocks to enable correct data to be output without the need for a selector data store.

A fifth aspect of the present invention provides a data processing apparatus operable to process data said data processing apparatus comprising a processor for processing data and data storage control circuitry according to a fourth aspect of the present invention.

A sixth aspect of the present invention provides a method of storing data within a data store in a data processing apparatus, said data store storing blocks of data, said method comprising the steps of: determining which bits within said data store are faulty bits; grouping an odd number of at least three data blocks each having at least one faulty bit together, said data blocks being grouped such that a majority of said data blocks within a group do not have a faulty bit in a same location and storing information about said groupings in a group data store; storing data in said blocks in said data store, such that if data is to be stored in a block present in one of said groups of blocks, said data is stored in each of said blocks within said group; and in response to an instruction to access said data store, determining from said group data store if said data to be accessed is in a block that has been grouped with at least two further blocks; if it is not access said block; and if it is compare each bit of data from said data blocks within said group and for each bit output a value stored for said bit by a majority of said data blocks.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1A:
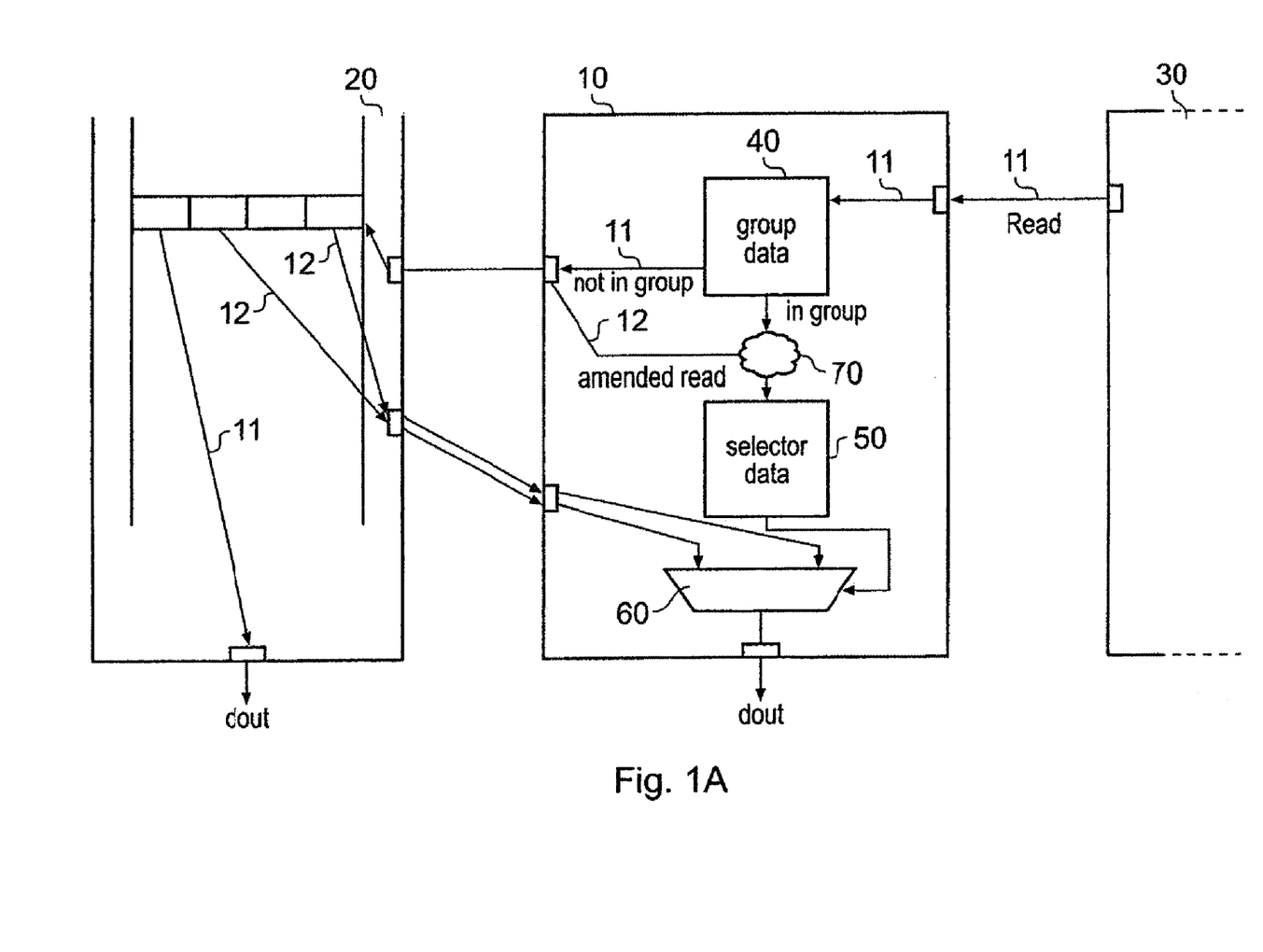
FIG. 1a shows a read operation to a data store from a data processor via data storage control circuitry according to an embodiment of the present invention.

FIG. 1a schematically illustrates data storage control circuitry 10 performing a read operation. A read command 11 is sent from data processor 30 to data storage control circuitry 10. It is then compared with data in the group data store 40 to determine if the block to be read is part of a grouped block or not. If it is in a group then logic 70 is accessed and here read command 11 is amended to read all the blocks within that group. Amended read 12 is then forwarded to the data store 20. If it is not in a group then the read command 11 is forwarded to data store 20 unchanged.

Within data store 20 original read 11 reads the data block indicated in the read command and outputs this at a data output. In this embodiment the data output is shown on data store 20, however it could be that this data is returned to data storage control circuitry 10 and is output from there.

If the read has been amended then the blocks within the group, in this case two blocks, are read and these are output back to data storage control circuitry 10. These two blocks are input to multiplexer 60. Multiplexer 60 selects bits from each of the blocks in dependence upon information input from selector data store 50. Selector data store 50 receives an input from logic 70 indicating the group that the data block is within. Thus, the selector data corresponding to this group is output to multiplexer 60 and the non-faulty bits of the blocks are selected in dependence upon this data such that the non-faulty data bits are output.

Figure 1B:
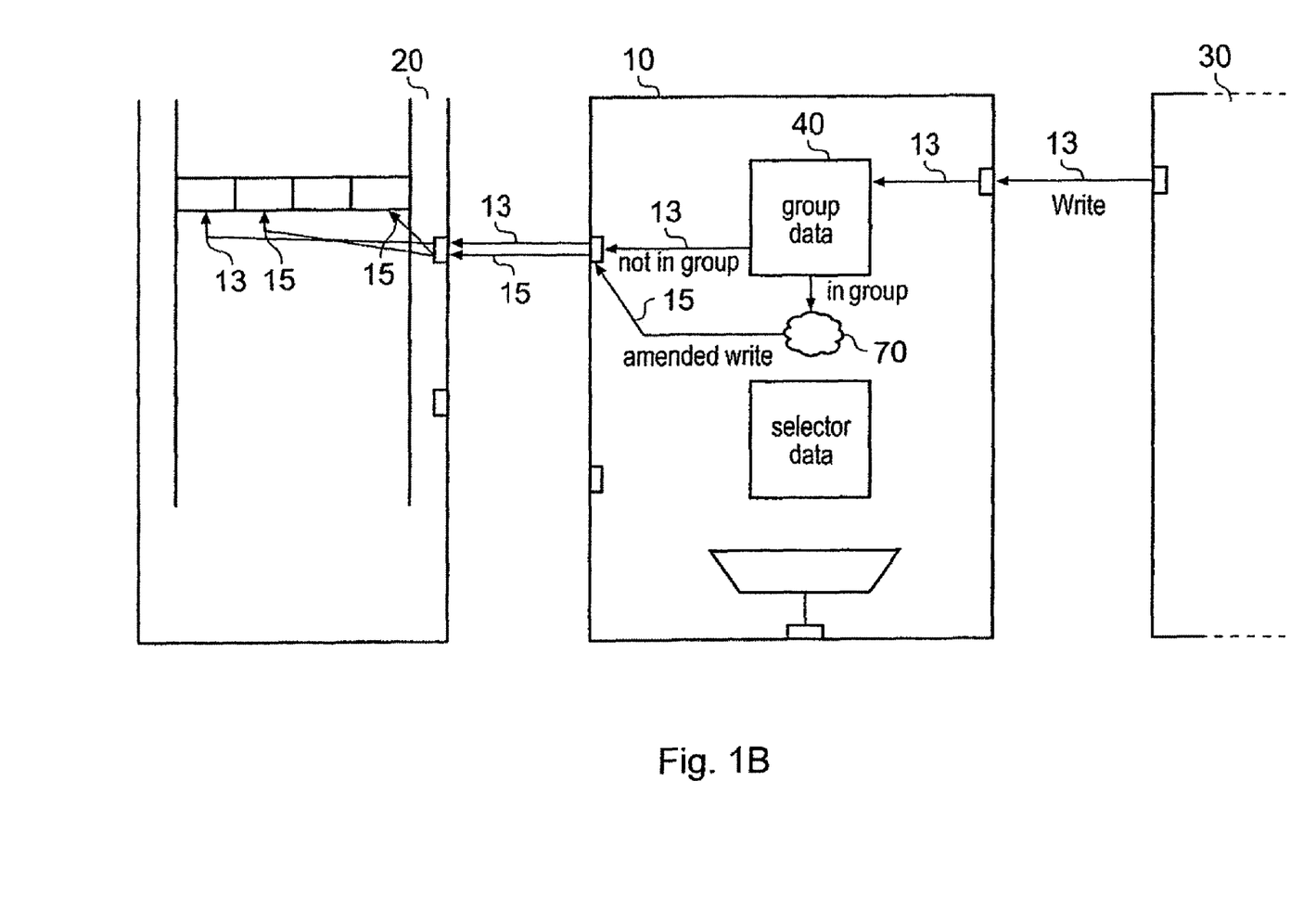
FIG. 1b shows a write operation to a data store from a data processor via data storage control circuitry according to an embodiment of the present invention.

FIG. 1b shows the same apparatus with a write being performed. In this example write command 13 is sent from processor 30 to data storage control circuitry 10. The write command is compared with information in the group data store 40 to see if it is writing to a block that is within a group. If it is not in a group then it means that it is a block that has no faulty bits in it and data is simply written to that block in data store 20. If the block is in a group then it is a block that has a faulty bit in it and it has been grouped with at least one other block that has faulty bits, but faulty bits in different locations. In this embodiment two blocks are grouped together. If it is in the group then a message is sent to logic 70 and write command 13 is amended to produce write command 15 which instructs the writing of the data to both blocks within the group. Write command 15 is then sent to data store 20 and two data blocks are written, these two data blocks being the original data block to be written and the other data block in the group.

Figure 2:
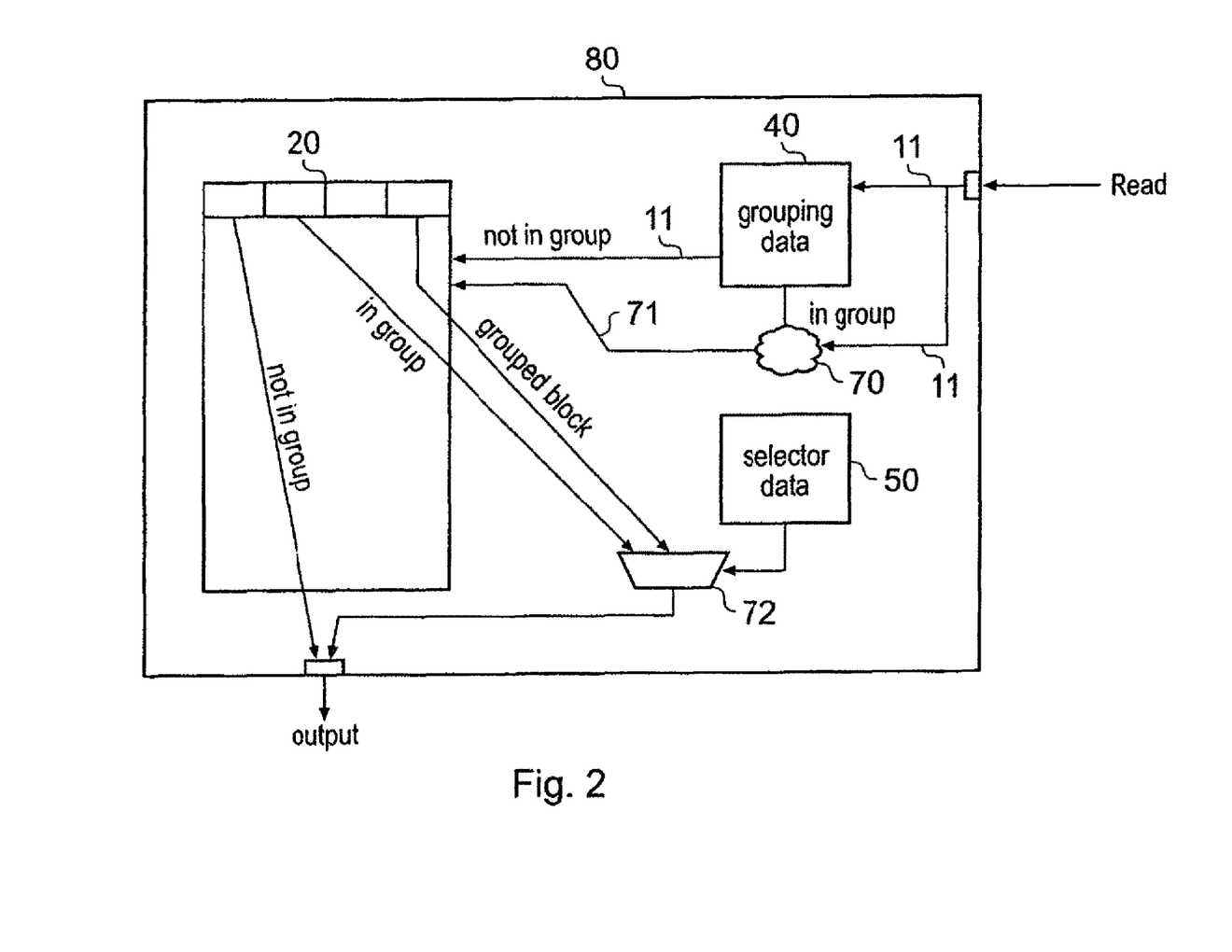
FIG. 2 shows a data store according to an embodiment of the present invention.

FIG. 2 shows data store 80 according to an embodiment of the present invention. Data store 80 comprises data storage control circuitry as well as the data store 20 itself. Thus, in this figure a read is received and similar to FIG. 1a it is determined if it is to read a block with faults in i.e. a block that appears in the group data store 40. If it does then the read is amended to read the blocks within the group. These are then output to multiplexer 72 and the appropriate bits are selected using selector data 50 appropriate to that group. If it is not in the group then the read is simply sent to data store 20 and then block indicated in the read is output.

Figure 3:
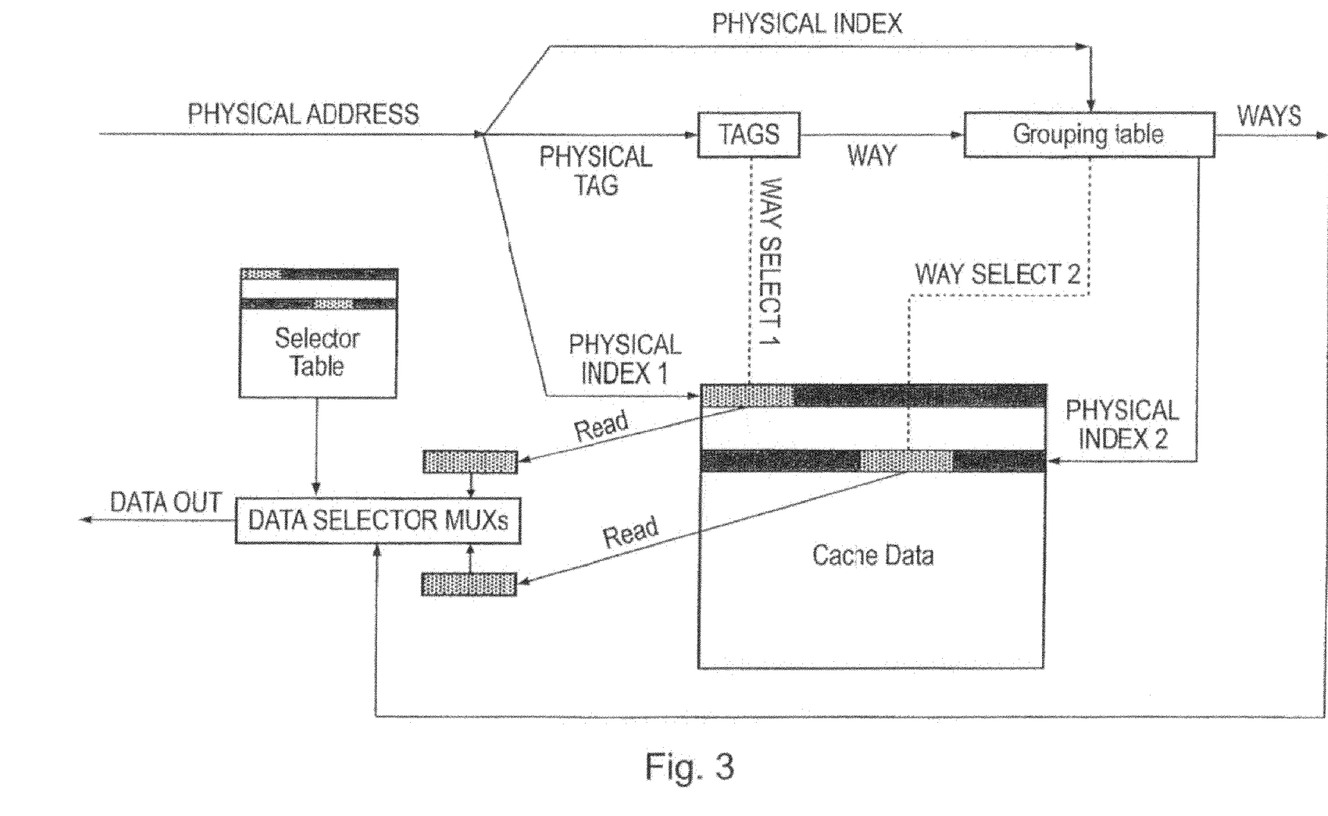
FIGS. 3, 4 and 5 show the storage of data within caches according to an embodiment of the present invention.
Figure 4:
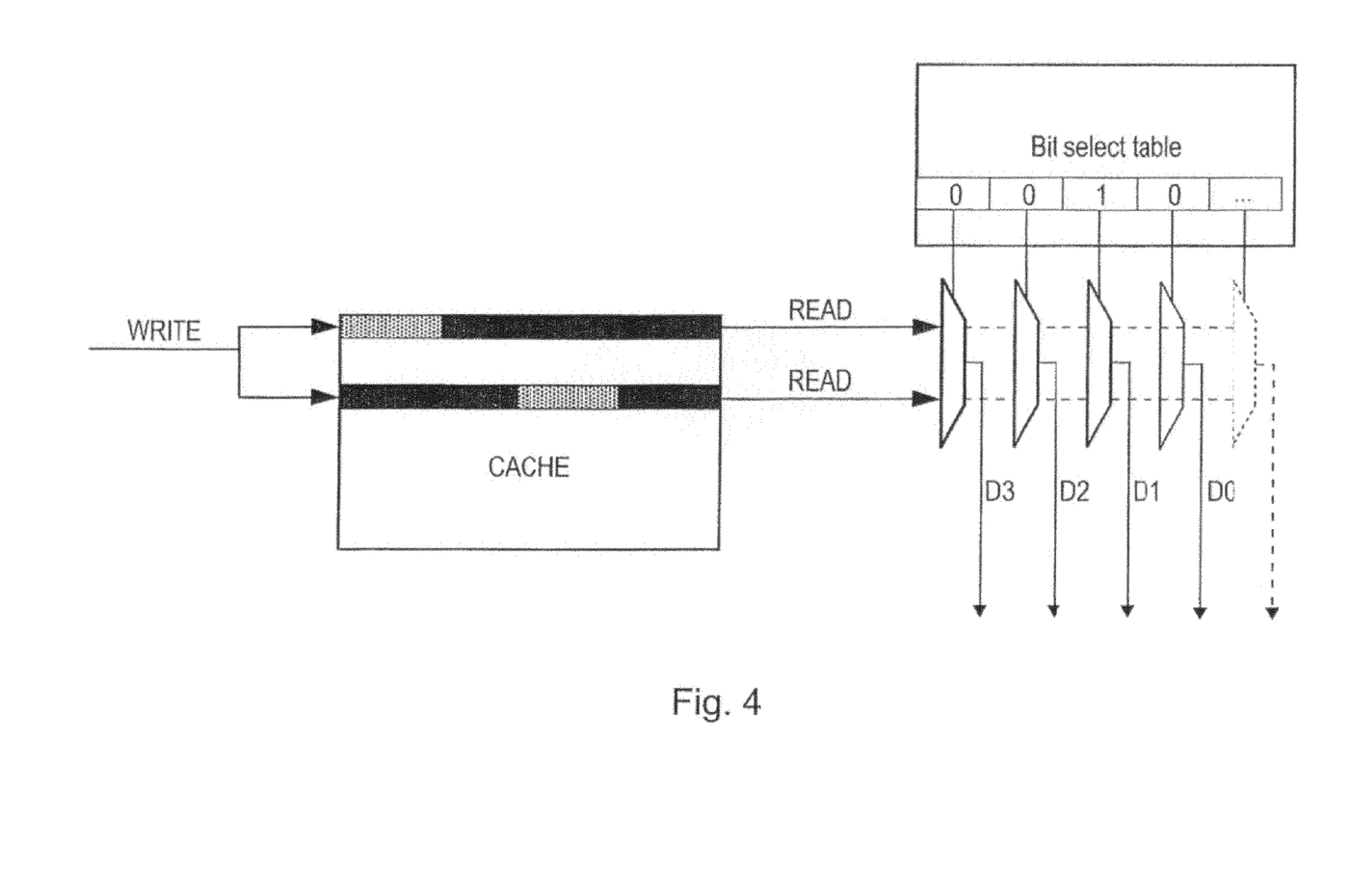
Figure 5:
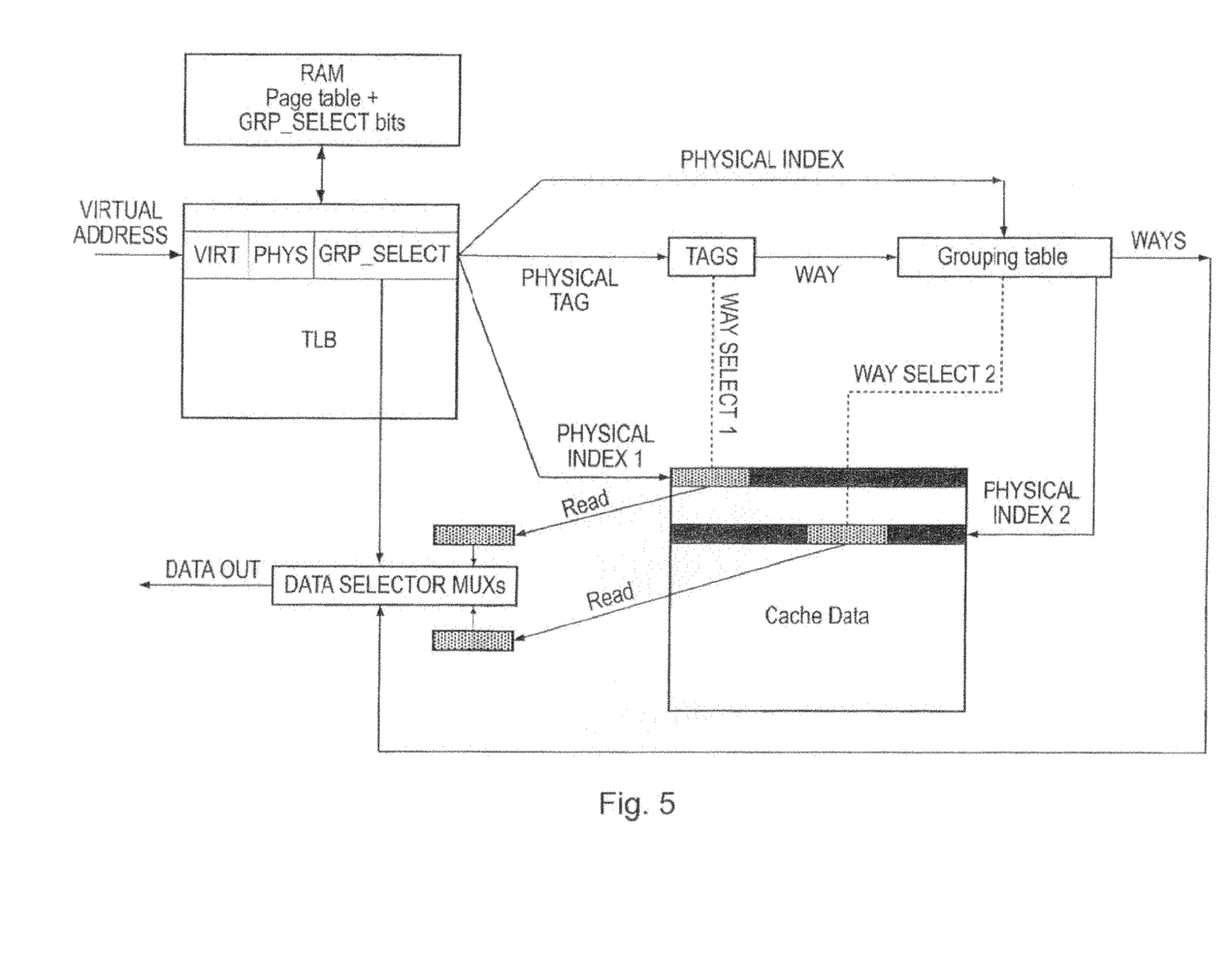

FIGS. 3, 4 and 5 relate to cache memories although the principles described can be applied to any storage device.

Cache blocks or sub-blocks are grouped or stacked together (in groups of size G) to form new, more reliable blocks. Blocks can be selected as physically adjacent or arbitrarily grouped (depending on the desired complexity of block selection hardware). For example, grouping can be restricted to blocks in the same row of a cache or in arbitrary locations anywhere in the cache. In each column of bits, only one bit is required to be non-faulty. Blocks meeting these criteria are called "compatible". When writing to a new block, all grouped blocks can be written in parallel since writing to a known faulty bit is not a problem. When reading, one good bit must be selected from the group for each bit position. The storage bits which determine the index of one non-faulty cell in a column are called "selector bits".

This scheme allows the one good bit in each bit column of G grouped blocks to be indexed individually. This must be done for data reading. Data writing may either blindly write all bits in parallel, or through DEMUXes write to only the predetermined good bit. As an example of the improved fault-tolerance, in an 8-way cache set where all blocks are grouped to form one block, majority voting is limited to up to $3/8$ faults per logical bit, whereas this scheme allows up to $7/8$.

The selector table itself can be generated using built-in self test (BIST) at power-on, OS boot or at operating point changes. Changes in frequency, voltage, temperature and other environmental conditions can change the number and location of faulty bits.

FIG. 3 outlines the scheme. It is based on a version of the scheme where blocks are grouped in pairs which may be arbitrarily located within the cache. Also, the bit selection logic presented has many variations. The most simple implementation is shown in FIG. 4.

A cache access proceeds as normal. When the tag match has completed, the physical block location of this "primary block" in the cache is known. This information is used to find the "secondary" block location via the "grouping table". This stores the set and way of another compatible block. Write operations can write to both blocks. These blocks may be in the same or different banks (for higher performance). Read operations use the bits in the "Selector table" which contains an extra bit for every position in a logical data word. The selector bit says whether the value for that bit position should come from the primary or secondary block. The selected bits are combined to form a single error-free block.

There are several variables which can be changed to decrease implementation cost and complexity at the expense of fault tolerance capability.

- More than one bit column can be covered by a single selector bit to reduce storage overhead.
- Groups can be accessed either by lookup table or by employing the existing tag matching mechanism (blocks sharing the same tag will result in multiple hits).
- Error correction can be applied to the selector bits themselves as well as placing them in larger or higher-voltage memory cells. Blocks can be grouped within sets rather than arbitrarily to reduce design complexity.

Embodiments of the invention reduce the on-chip storage required for the block grouping scheme without a significant performance overhead.

However, there is a small performance overhead due to program working set changes. At this point, built-in self test has to be performed again for a portion of the cache, or previously derived selector bits must be loaded on-chip.

The memory block grouping scheme has the "selector table" replaced with a small number of buffers. These buffers are the size of a cache page and may be considered a parallel structure to a standard TLB. Assuming that typical page sizes are small (e.g. 4 KB for Linux workloads), the structure effectively caches the working set of selector bits without needing to hold enough selector bits to cover the entire cache. Consequently, this reduces chip area and improves yield by reducing the amount of non-faulty storage required on-chip. The basic scheme stores selector bits determined at BIST time in memory, using a structure similar to a page table. Every page has an associated set of selector bits representing the physical cache blocks to which it is mapped.

FIG. 5 illustrates the concept.

During a TLB lookup, we obtain both a physical address and the appropriate selector bits for the block grouping scheme. These are only used when reading data from the cache, to determine how to combine bits in the group to produce an error-free block.

On a TLB miss, the appropriate page table data is read from memory in addition to the set of selector bits for the newly accessed page. Simulations suggest that using 24 selector bit pages on-chip reduces total storage overhead of the block grouping scheme to around 5% while incurring a 5% to 10% performance penalty. This can be reduced by having more selector bit pages.

Selector bits can either be stored in memory as previously mentioned or re-generated using a state-preserving BIST mechanism on every TLB miss. This may be less costly than a memory access in terms of performance and energy, especially if that access must be off-chip.

Rather than storing entire pages of selector bits on-chip (since not all words in a page will be accessed) each selector page can be implemented as a smaller cache of the N most recently accessed blocks.

Figure 6A:
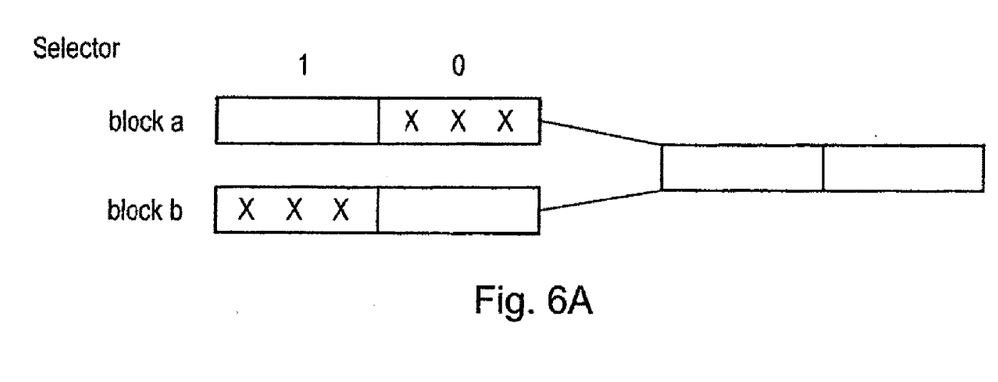
FIGS. 6a and 6b illustrate the grouping of data blocks.

FIG. 6a shows two data blocks, block A and block B that appear in the same group and their appropriate selector bits. In this embodiment, the blocks have been divided into two sections such that only two selector bits are require to determine which are the good bits to output. This is clearly advantageous in that the number of select bits are few, however it has the drawback that only particular blocks can fulfil this requirement. In the example shown block A has faults only in the second half of the block whereas block B has faults in the first half. Thus, selecting the first half of block A and the second half of block B gives an output data block that is error free.

Figure 6B:
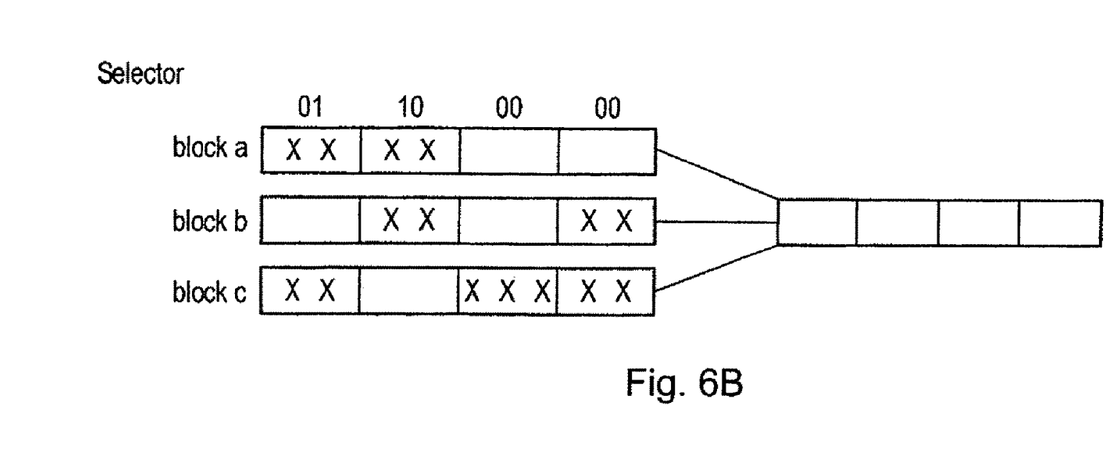

FIG. 6b shows an alternative embodiment where the data blocks are divided into four sections. In this embodiment the group contains three blocks, block A, block B and block C. The advantage of using three blocks in a group is that it is easier to produce a group which has no errors in some of the segments. However, in order to select a particular block within the group more selection bits are needed. In this case block A is indicated by 00, block B by 01 and block C by 10.

Figure 7:
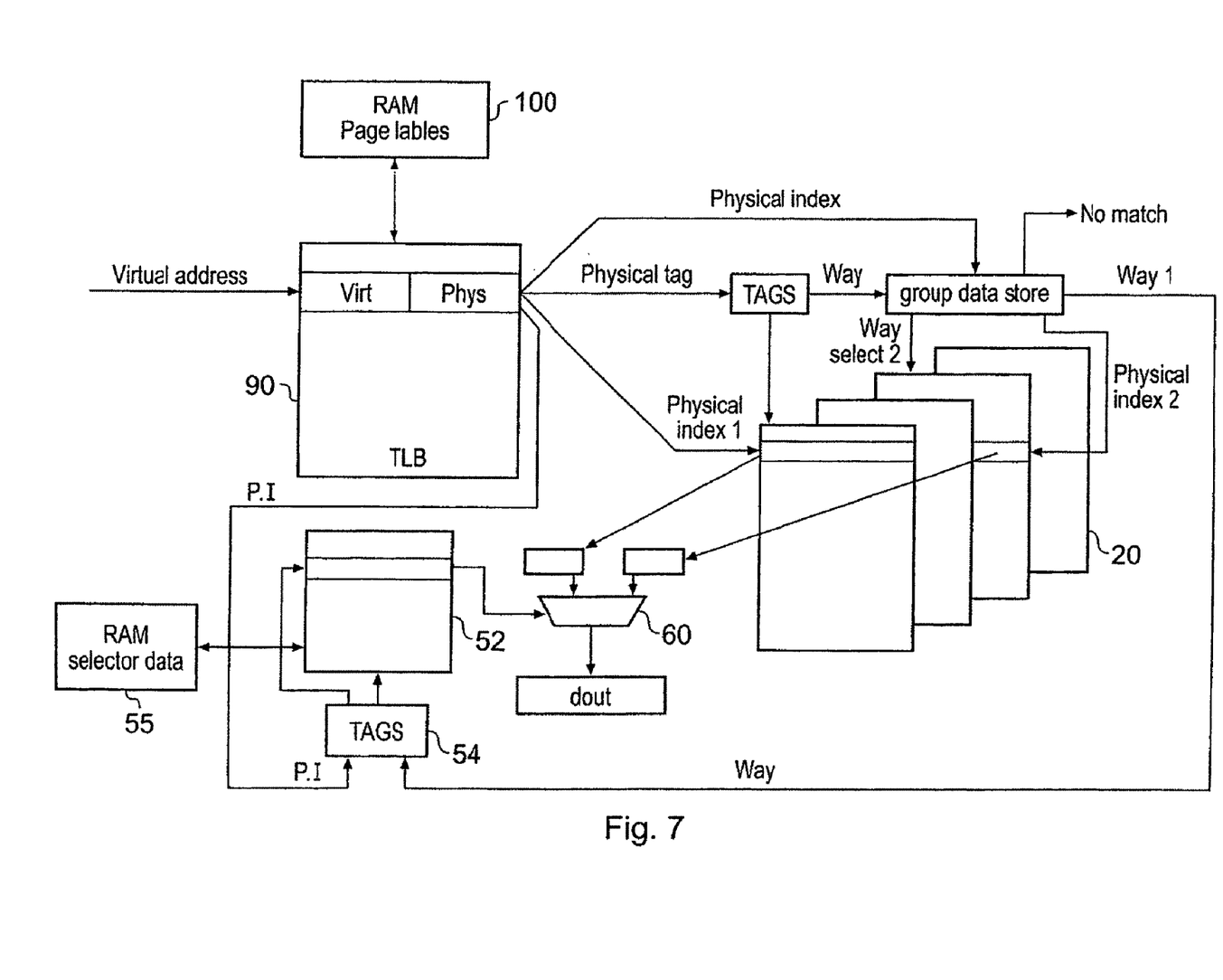
FIG. 7 shows a portion of a data processing apparatus according to an embodiment of the present invention.

FIG. 7 shows a portion of data processing apparatus according to an embodiment of the present invention. This data processing apparatus comprises a table look aside buffer 90 a RAM 100 for storing the page tables and a cache 20. When accessing data within the cache, a virtual address is sent to the table look aside buffer and a physical index and physical tag are output. The physical index indicates a line within cache 20 whereas the physical tag indicates the way. Thus, a tag comparison is done and a way is selected. The physical index and the way are then sent to the group data store to see whether or not the location in the cache that is to be accessed is within a group. If there is a "no match" then it is not in a group and this block can be accessed and the data from it retrieved and output. If there is a match then the other block in the group is identified using physical index 2 and way select 2 that are stored in the group data store. In such a case then the two data blocks are output from the cache and multiplexer 60 selects the appropriate bits using data from selector data store 52. In this case selector data store 52 is a buffer that holds a portion of the entire selector data. The entire selector data being stored in this embodiment in RAM 55. In some embodiments it is not stored separately in a RAM but is generated in response to tests being performed on the cache. The appropriate selector data is identified using tags from the physical index and way information. By in effect only storing a portion of the selector data in buffer 52 the amount of data that needs to be stored is reduced. Furthermore, as this data processing apparatus uses table look aside buffers then only a particular page of a memory can be accessed at a particular time otherwise the table look aside buffer will need to be updated. Thus, the corresponding portion of the cache can be within the selector buffer 52 or a portion of it and thus, when the table look aside buffer is updated the selector buffer 52 can also be updated. This arrangement therefore allows fewer bits to be stored within the data processing apparatus and yet does not impede performance times unduly. Furthermore, it uses similar hardware systems to those used for accessing the cache and it is therefore efficient to implement.

Figure 8:
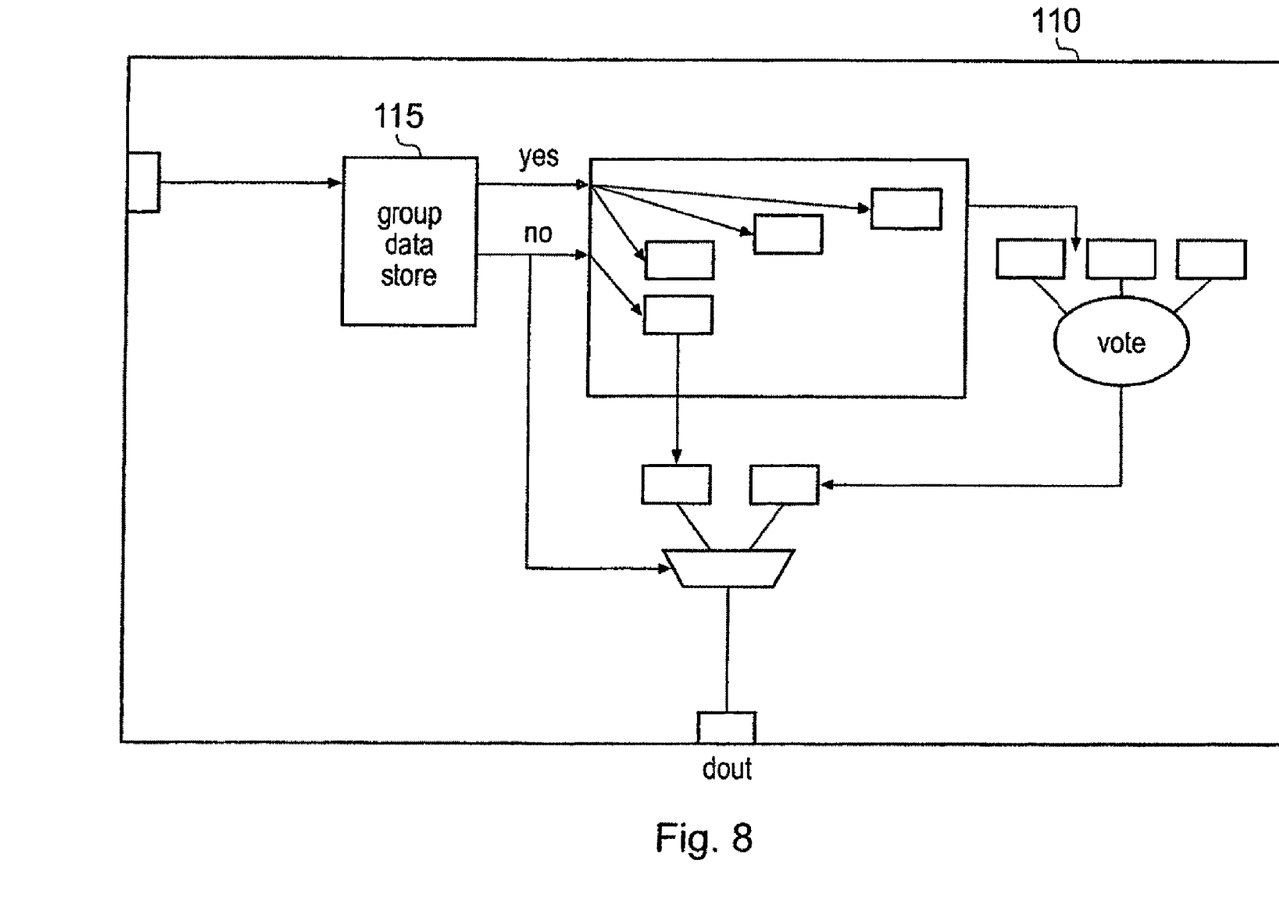
FIG. 8 shows a data store according to a further embodiment of the present invention.

FIG. 8 shows an alternative embodiment of the present invention in which no selector data is used. FIG. 8 shows a data store 110 according to an embodiment of the present invention. Data store 110 comprises a group data store 115 which comprises groups of three data blocks. These groups comprise three data blocks that all have faults in them but that are grouped such that none of them have a faulty bit in the same location. Thus, when a read command is received it is checked to determine if it is within a group in the group data store 115. If it is then the read command is amended to access the three data blocks within the group. These three data blocks are then output and a vote is made such that the bits that are output are the ones where two or more of them are the same. If the data block does not appear in the group table then the read command is not amended and the block indicated in the read is simply accessed and output.

A data write similarly is sent via the group data store 115. If the block is within a group then data is written to the three blocks indicated in the group. If it is not in a group then data is simply written to the block indicated in the write.

It should be noted that although for the sake of simplicity this embodiment has grouped three data blocks together it will be clear to the skilled person that this is just an example and that more than three data blocks can be grouped together provided that the number of data blocks in a group is an odd number and that for each data storage location a majority of the blocks do not have faulty bits. The correct output can be then be achieved by simply outputting the value for each location that a majority of the data blocks store.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent could be made with the features of the independent claims without departing from the scope of the present invention.

The invention claimed is:

1. Data storage control circuitry for controlling storage and retrieval of data in a cache having at least two cache ways, in which data is stored in data blocks, each of said data blocks comprising a plurality of data storage bits, said cache comprising at least one faulty data storage bit within at least some of said data blocks;
    said data storage control circuitry being configured to group at least one of said data blocks from said cache that has at least one faulty data storage bit with at least one other data block from a different cache way of said cache to form a group of data blocks; and
    a selector data store for storing indicators for each of said groups of data blocks, said indicators indicating which bits of said data blocks within a group are said non-faulty bits;
    data access logic responsive to an instruction to read data from a data block that is present in one of said groups of data blocks, to read each of said plurality of data storage bits from a selected one of said data blocks within said group, said one of said data blocks being selected in dependence upon said stored indicators for said group such that no faulty data storage bits are read, wherein said selector data store stores, for each group of data blocks, a set of indicators, each indicator corresponding to two or more bits of said data blocks, said set of indicators indicating which data block each of said corresponding two or more bits is to be read from, said data blocks being grouped such that at least one of said data blocks within a group comprises non-faulty bits within each of said sets of two or more bits.

2. Data storage control circuitry according to claim 1, said data storage control circuitry further comprising a group data store for storing information identifying data blocks that are grouped together to form said groups of data blocks.

3. Data storage control circuitry according to claim 2, wherein said group data store and said selector data store do not comprise faulty bits.

4. Data storage control circuitry according to claim 2, wherein said group data store and said selector data store are formed from storage circuitry having larger storage cells than storage circuitry forming said data store.

5. Data storage control circuitry according to claim 2, wherein said group data store and said selector data store are formed from higher voltage storage circuitry than storage circuitry forming said data store.

6. Data storage control circuitry according to claim 2, wherein said group data store and said selector data store comprise error correction means.

7. Data storage control circuitry according to claim 1, wherein said data blocks grouped to form said group of data blocks are in a same cache line.

8. Data storage control circuitry according to claim 2, and further comprising said cache for storing data in said data blocks.

9. A data processing apparatus for processing data said data processing apparatus comprising:
    a processor for processing data;
    data storage control circuitry for controlling storage and retrieval of data in a cache having at least two cache ways, in which data is stored in data blocks, each of said data blocks comprising a plurality of data storage bits, said cache comprising at least one faulty data storage bit within at least some of said data blocks;
    said data storage control circuitry being configured to group at least one of said data blocks from said cache that has at least one faulty data storage bit with at least one other data block from a different cache way of said cache to form a group of data blocks; and
    a selector data store for storing indicators for each of said groups of data blocks, said indicators indicating which bits of said data blocks within a group are said non-faulty bits, wherein said selector data store stores, for each group of data blocks, a set of indicators, each indicator corresponding to two or more bits of said data blocks, said set of indicators indicating which data block each of said corresponding two or more bits is to be read from, said data blocks being grouped such that at least one of said data blocks within a group comprises non-faulty bits within each of said sets of two or more bits;
    data access logic responsive to an instruction to read data from a data block that is present in one of said groups of data blocks, to read each of said plurality of data storage bits from a selected one of said data blocks within said group, said one of said data blocks being selected in dependence upon said stored indicators for said group such that no faulty data storage bits are read.

10. A data processing apparatus according to claim 9, said data processing apparatus further comprising testing logic for testing said cache for faulty bits, said testing logic being adapted to populate said selector data store in response to a test of said cache.

11. A data processing apparatus according to claim 9, said data processing apparatus further comprising said cache for storing data processed by said processor.

12. A method of storing data within a cache in a data processing apparatus, said cache having at least two cache ways in which data is stored in data blocks, each of said data blocks comprising a plurality of data storage bits, said cache comprising at least one faulty data storage bit within at least some of said data blocks said method comprising the steps of:
    determining which data storage bits within said cache are faulty data storage bits;
    grouping together at least one of said data blocks that has at least one of said faulty data storage bits with at least one other data block from a different cache way to form a group of data blocks;
    storing indicators for each of said groups of data blocks within a selector data store, said indicators indicating which data storage bits within said grouped data blocks are said faulty data storage bits, wherein each indicator corresponding to two or more bits of said data blocks, said set of indicators indicating which data block each of said corresponding two or more bits is to be read from, said data blocks being grouped such that at least one of said data blocks within a group comprises non-faulty bits within each of said sets of two or more bits; and in response to an instruction to access said data store, determining if said data to be accessed is in a block that has been grouped with at least one other block;

if it is not access said block; and if it is access each bit of said data from a particular one of said data blocks within said group in dependence upon said stored indicators for said group such that no faulty bits are read.

13. A method according to claim 12, comprising a further step of: storing information about said groupings of data blocks in a group data store.

14. A method according to claim 12, wherein said data blocks grouped to form said group of data blocks are in a same cache line.

15. Data storage controlling means for controlling storage and retrieval of data in a cache having at least two cache ways, in which data is stored in data blocks, each of said data blocks comprising a plurality of data storage bits, said cache comprising at least one faulty data storage bit within at least some of said data blocks;

said data storage controlling means circuitry being for grouping at least one of said data blocks from said cache that has at least one faulty data storage bit with at least one other data block from a different cache way to form a group of data blocks; and a selector data storage means for storing indicators for each of said groups of data blocks, said indicators indicating which bits of said data blocks within a group are said non-faulty bits, wherein said selector data means stores, for each group of data blocks, a set of indicators, each indicator corresponding to two or more bits of said data blocks, said set of indicators indicating which data block each of said corresponding two or more bits is to he read from, said data blocks being grouped such that at least one of said data blocks within a group comprises non-faulty bits within each of said sets of two or more bits;

data access logic means responsive to an instruction to read data from a data block that is present in one of said groups of data blocks, for reading each of said plurality of data storage bits from a selected one of said data blocks within said group, said one of said data blocks being selected in dependence upon said stored indicators for said group such that no faulty data storage bits are read.

* * * * *